Patented Jan. 9, 1945

2,367,155

UNITED STATES PATENT OFFICE 2,367,155

INSECTICIDAL COMPOSITION

Friar M. Thompson, Jr., Wilmington, Del., assignor to Hercules Powder Company, Wilmington, Del., a corporation of Delaware No Drawing. Application May 23, 1941,
Serial No. 394,787

14 Claims. (Cl. 167—24)

This invention relates to insecticides and more particularly to insecticides containing terpene haloacyl esters.

Contact insecticides usually consist essentially of an active toxic ingredient such as pyrethrum or rotenone extended by a carrier material. Effective insecticides of this nature are widely used, but it would be desirable to reduce the expense and to increase the effectiveness of the material. The active toxic ingredients are rather expensive and do not bring about as high a kill as is desired in quantities which are soluble in the carrier or are economically feasible to use.

It is an object of this invention to enhance the toxic effect of such active ingredients as pyrethrum, rotenone and the like so that a greater kill may be obtained with the same quantity of toxic ingredient or so that the same kill can be obtained with reduced amounts of expensive toxic ingredients. Other objects will be noted hereinafter.

The objective of this invention is attained by adding to the active toxic ingredient of an insecticidal composition a terpene haloacyl ester to enhance the toxic effect of the active ingredient. The terpene haloacyl esters have substantially no toxic effect in concentrations normally used for toxic agents in insecticides. However, these esters greatly increase the paralytic and destructive action of the essential ingredient of the insecticide.

Suitable terpene haloacyl esters for use as activators in the compositions according to this invention comprise, for example, chloroacetic, chloropropionic, dichloropropionic, chlorobutyric, chlorostearic, chloroleic, chlororicinoleic, chloroglycollic, chloronaphthenic, chlorobenzoic, chlorophthalic and the like esters of such terpene tertiary alcohols as alpha-terpineol, beta-terpineol, terpin, etc.; such terpene secondary alcohols as fenchyl alcohol, the bornyl alcohols (i. e., bornyl alcohol and isobornyl alcohol), etc. The corresponding bromine, iodine and fluorine substituted carboxylic acid esters are similarly suitable. Esters of this nature may be obtained by treating a terpene alcohol or an unsaturated terpene or terpene mixture such as, for example, alpha-terpineol, fenchyl alcohol, bornyl alcohol, isobornyl alcohol, pine oil, alpha-pinene, beta-pinene, dipentene, terpinene, terpinolene, carene, allo-ocimene, linalool, fenchene, bornylene, terpinyl acetate, terpinyl propionate, terpinyl methyl ether, terpinyl ethyl ether, terpinyl glycol ether, terpinyl glycerol ether, terpinyl fenchyl ether, allo-ocimene formaldehyde condensate, sobrerol, sobrerol monoethyl ether, turpentine, etc. with a halogen containing carboxylic acid at a temperature between about 0° C. and about 200° C. (usually between 40 and 150° C.) and recovering the resulting haloacyl ester from the reaction mixture. Terpene tertiary alcohols such as terpineol, terpin, and the like may be esterified by mixing with an acid anhydride of a halogen containing carboxylic acid in the presence of sodium acetate or pyridine for several weeks at ordinary room temperatures. Halogenated lower fatty acid esters, such as the chloroacetic esters of terpene secondary alcohols, particularly of fenchyl and the bornyl alcohols and similar esters of terpene tertiary alcohols, particularly of terpin and terpineol, are preferably utilized since they are readily and inexpensively obtained and are particularly effective.

This invention is particularly concerned with contact insecticides in which an active toxic ingredient is carried or extended by a more or less inert medium. Thus, the terpene haloacyl ester may be mixed with and incorporated into dusting compositions, such as, for example, ground derris root, ground cube root, ground timbo root, pulverized pyrethrum flowers used per se or with further extension of the active ingredient, for example, with powdered sulfur, bentonite, kieselguhr, talc, etc. Similarly, the terpene haloacyl ester may comprise a part of the carrier of a liquid insecticide containing an active toxic ingredient, such as pyrethrum extract, rotenone; toxic rotenone derivatives, such as dihydrorotenone and acetyl rotenone; rotenoids, such as deguelin, toxicarol, etc.; extracts of derris, cube, timbo, devil's shoestring, barbasco, etc.; organic thiocyano compounds, such as lauryl thiocyanate, B-butoxy-B'-thiocyano diethyl ether, terpinyl dithiocyano acetate, etc. The carrier liquid will usually be an inert relatively inexpensive liquid, such as water, kerosene, alcohol, acetone, petroleum oil, and the like utilized as solvents or for dispersions of the emulsion type.

The terpene haloacyl ester will in most cases comprise from a small proportion such as about 0.1% by weight up to about 10% by weight of the finished insecticide. For the ordinary spray insecticide of the type suitable for household use a quantity between about 3 and about 6% of the finished insecticide is preferred. However, concentrates suitable for dilution to form the finished insecticide may contain much higher quantities of the activating ester and may consist entirely of a mixture of active toxic ingredient and terpene haloacyl ester as the activator.

Examples of contact insecticides suitable for dusting in accordance with this invention are given in Table 1.

TABLE 1

*Examples of dusting insecticides*

|  | 1 | 2 | 3 | 4 | 5 | 6 |
|---|---|---|---|---|---|---|
|  | Per cent | Per cent | Per cent | Per cent | Per cent | Per cent |
| Terpinyl bromobutyrate | 10 |  |  |  |  |  |
| Isobornyl chloroacetate |  | 5 |  |  | 10 | 5 |
| Fenchyl chloroacetate |  |  | 8 | 5 |  |  |
| Ground derris root | 50 |  |  |  |  |  |
| Ground cube root |  |  | 50 |  |  |  |
| Ground pyrethrum flowers |  |  | 92 |  |  |  |
| Kieselguhr | 40 | 45 |  | 90 | 20 | 40 |
| Pyrethrum extract (20:1) |  |  |  | 5 |  |  |
| Rotenone |  |  |  |  | 0.5 |  |
| Bentonite |  |  |  |  | 69.5 | 50 |
| Terpinyl thiocyanoacetate |  |  |  |  |  | 5 |

Examples of liquid contact sprays are given in Table 2. It will be noted that Examples 2 and 4 of Table 2 consist of emulsions of water-insoluble material in water with sodium oleate as an emulsifying and spreading agent.

TABLE 2

*Examples of liquid insecticides*

|  | 1 | 2 | 3 | 4 | 5 | 6 | 7 | 8 | 9 | 10 |
|---|---|---|---|---|---|---|---|---|---|---|
| Terpinyl chloroacetate |  | 5 |  |  |  |  |  |  |  |  |
| Bornyl chloroacetate | 2 |  |  |  |  |  | 7 | 4 |  |  |
| Fenchyl chloroacetate | 3 |  |  |  |  |  |  |  |  | 5 |
| Bornyl iodoacetate |  |  | 3 |  |  |  |  |  |  |  |
| Terpin bis (chloroacetate) |  |  |  |  | 5 |  | 2 |  |  |  |
| Terpin bis (alpha-chloropropionate) |  |  |  | 10 |  |  |  |  |  |  |
| Terpin bis (alpha-bromobutyrate) |  |  |  |  |  | 4 |  |  |  |  |
| Rotenone |  | 1 |  |  |  |  |  |  |  | 0.2 |
| Dihydrorotenone |  |  |  | 1 |  |  |  |  |  |  |
| Total ether extract of Derris elliptica |  |  | 0.5 |  |  |  |  |  |  |  |
| Pyrethrum extract (20:1) | 5 |  |  |  | 2.5 | 5 | 2 |  |  | 2.8 |
| Beta-butoxy, beta'-thiocyano diethyl ether |  |  |  |  |  |  |  | 5 |  |  |
| Terpinyl thiocyanoacetate |  |  |  |  |  |  | 2 |  | 3 |  |
| Nicotine sulphate |  |  |  | 1 |  |  |  |  |  |  |
| Deodorized kerosene | 90 |  | 96.5 |  | 91.5 | 91 | 94 | 88 | 93 | 90 |
| Pine oil |  | 1 |  |  |  | 1 |  |  |  | 2 |
| Sodium oleate |  | 2 |  | 2 |  |  |  |  |  |  |
| Water |  | 91 |  | 86 |  |  |  |  |  |  |

The effect of chloroacetates of terpene secondary alcohols is illustrated by Table 3 which gives the results of Peet-Grady toxicity tests on house flies of a pyrethrum-kerosene spray and such a spray modified by addition of various quantities of the activator. It will be noted that the addition of the terpene haloacyl ester brought about a very marked increase in the percentage of flies killed in the standard testing procedure. It will also be noted that this effect persisted and was, in fact, slightly increased after ten months of storage of the insecticides tested. When similar Peet-Grady tests were made on an insecticide consisting of a 5% solution of the particular mixture of bornyl and fenchyl chloroacetates utilized in the Table 3 tests in kerosene, the result was a zero knockdown and a zero kill of the flies.

TABLE 3

*Effect of terpene secondary alcohol haloacyl esters*

CONCENTRATION IN DEODORIZED KEROSENE

| 20:1 pyrethrum extract concentrate | Terpene sec.-alcohol chloroacetates [1] | Knockdown 10 min. | Kill 24 hrs. | Improvement in kill |
|---|---|---|---|---|
| Percent | Percent | Percent | Percent | Percent |
| 2.5 | 0 | 91.7 | 30.4 |  |
| 2.5 | 1 | 94.4 | 37 | 21.7 |
| 2.5 | 2 | 95 | 50.5 | 66 |
| 2.5 | 4 | 95.6 | 57.8 | 90 |
| 2.5 | 5 | 96.4 | 64.4 | 112 |

AFTER 10 MONTHS' STORAGE IN AMBER GLASS

| 2.5 | 0 | -------- | 34.2 | -------- |
| 2.5 | 1 | -------- | 43 | 25.7 |
| 2.5 | 2 | -------- | 59.7 | 74.6 |
| 2.5 | 4 | -------- | 69.9 | 104 |
| 2.5 | 5 | -------- | 70.3 | 106 |

[1] Mixture of bornyl and fenchyl chloroacetates.

Somewhat similar results were obtained upon comparing the effectiveness of a pyrethrum insecticide on roaches with the effectiveness of the same insecticide with 5% of the terpene secondary alcohol chloroacetates as activator. The unmodified pyrethrum insecticide required two minutes to paralyze the roaches and eventually kill 80% of the insects used. The activated pyrethrum insecticide put all the roaches subjected thereto on their backs in thirty seconds, paralyzed them completely in one minute and ten seconds and killed 100%.

The effect of terpene tertiary alcohol haloacyl esters is illustrated by the data given in Table 4 which presents Peet-Grady test results using a pyrethrum insecticide with and without activation. Here, too, a very large increase in kill was obtained with substances which in a 5% solution in kerosene, under the same testing procedures, gave a zero kill.

TABLE 4

*Effect of terpene tertiary alcohol haloacyl ester*

CONCENTRATION IN DEODORIZED KEROSENE

| 20:1 pyrethrum extract concentrate | Terpene tertiary alcohol haloacyl ester | Kill 24 hrs. | Improvement in kill |
|---|---|---|---|
|  |  | Percent | Percent |
| 5% |  | 46.1 |  |
| 5% | 5% terpin bis (chloroacetate) | 95.5 | 107 |
| 5% | 5% terpin bis (alphachloropropionate) | 77.3 | 67.5 |
| 5% | 5% terpin bis (alphabromo-n-butyrate) | 82.3 | 76.3 |

It will be understood that the details and examples given hereinbefore are illustrative only and that the invention as broadly described and claimed is in no way limited thereby.

What I claim and desire to protect by Letters Patent is:

1. An insecticidal composition comprising an active ingredient selected from a plant body of the group consisting of comminuted derris root, cube root, timbo root, and pyrethrum flowers and a terpene haloacyl ester for enhancing the toxic effect of the active ingredient.

2. An insecticidal composition comprising toxic pyrethrum extractives and a terpene haloacyl ester for enhancing the toxic effect of the said extractives.

3. An insecticidal composition comprising a toxic extractive found in derris root and a terpene haloacyl ester for enhancing the toxic effect of the said extractive.

4. An insecticidal composition comprising rotenone and a terpene haloacyl ester for enhancing the toxic effect of the rotenone.

5. An insecticidal composition comprising an active ingredient selected from a plant body of the group consisting of comminuted derris root, cube root, timbo root, and pyrethrum flowers and a halogen-containing lower fatty acid ester of a terpene secondary alcohol for enhancing the toxic effect of the active ingredient.

6. An insecticidal composition comprising an active ingredient selected from a plant body of the group consisting of comminuted derris root, cube root, timbo root, and pyrethrum flowers and a halogen-containing lower fatty acid ester of a terpene tertiary alcohol for enhancing the toxic effect of the active ingredient.

7. An insecticidal composition comprising an active ingredient selected from a plant body of the group consisting of comminuted derris root, cube root, timbo root, and pyrethrum flowers and a terpene secondary alcohol chloroacetate for enhancing the toxic effect of the active ingredient.

8. An insecticidal composition comprising an active ingredient selected from a plant body of the group consisting of comminuted derris root, cube root, timbo root, and pyrethrum flowers and a terpene tertiary alcohol chloroacetate for enhancing the toxic effect of the active ingredient.

9. An insecticidal composition comprising an active ingredient selected from a plant body of the group consisting of comminuted derris root, cube root, timbo root, and pyrethrum flowers and terpinyl chloroacetate for enhancing the toxic effect of the active ingredient.

10. An insecticidal composition comprising an active ingredient selected from a plant body of the group consisting of comminuted derris root, cube root, timbo root, and pyrethrum flowers and fenchyl chloroacetate for enhancing the toxic effect of the active ingredient.

11. An insecticidal composition comprising an active ingredient selected from a plant body of the group consisting of comminuted derris root, cube root, timbo root, and pyrethrum flowers and a bornyl chloroacetate for enhancing the toxic effect of the active ingredient.

12. An insecticidal composition comprising toxic pyrethrum extractives and terpinyl chloroacetate for enhancing the toxic effect of the pyrethrum extractives.

13. An insecticidal composition comprising toxic pyrethrum extractives and a bornyl chloroacetate for enhancing the toxic effect of the pyrethrum extractives.

14. An insecticidal composition comprising toxic pyrethrum extractives and fenchyl chloroacetate for enhancing the toxic effect of the pyrethrum extractives.

FRIAR M. THOMPSON, Jr.